United States Patent [19]

Morse

[11] Patent Number: 4,607,927
[45] Date of Patent: Aug. 26, 1986

[54] PHOTOGRAPHIC FILM ASSEMBLAGE HAVING PREMOUNTED FILM FRAMES

[75] Inventor: John B. Morse, Boston, Mass.

[73] Assignee: Polaroid Corporation, Cambridge, Mass.

[21] Appl. No.: 772,555

[22] Filed: Sep. 4, 1985

[51] Int. Cl.⁴ .................... G03B 17/26; G03B 17/50
[52] U.S. Cl. ................................. 354/182; 354/76; 354/276
[58] Field of Search .............. 354/76, 83, 84, 85, 354/86, 88, 174, 180, 182, 276, 277

[56] References Cited

U.S. PATENT DOCUMENTS

| 478,780 | 7/1892 | Bristol | 354/182 |
| 3,443,500 | 12/1966 | Norton et al. | 354/180 |
| 3,728,949 | 4/1973 | Edwards | 354/275 |
| 3,925,796 | 12/1975 | Taylor | 354/180 |
| 4,114,166 | 8/1978 | Driscoll et al. | 354/76 |
| 4,568,163 | 2/1986 | Czumak et al. | 354/88 |

Primary Examiner—A. A. Mathews
Attorney, Agent, or Firm—Alfred E. Corrigan

[57] ABSTRACT

A photographic film assemblage for attachment to a photographic apparatus. The film assemblage includes a supply chamber having a stack of premounted film frames therein, a storage chamber into which the film frames are adapted to be advanced subsequent to their exposure, and a support member which interconnects the supply and storage chamber and functions to support a film frame in position for its exposure. The storage chamber is detachable coupled to the support so as to enable it to be removed therefrom prior to placing it in a processor for the processing of the exposed film frames contained therein.

10 Claims, 5 Drawing Figures

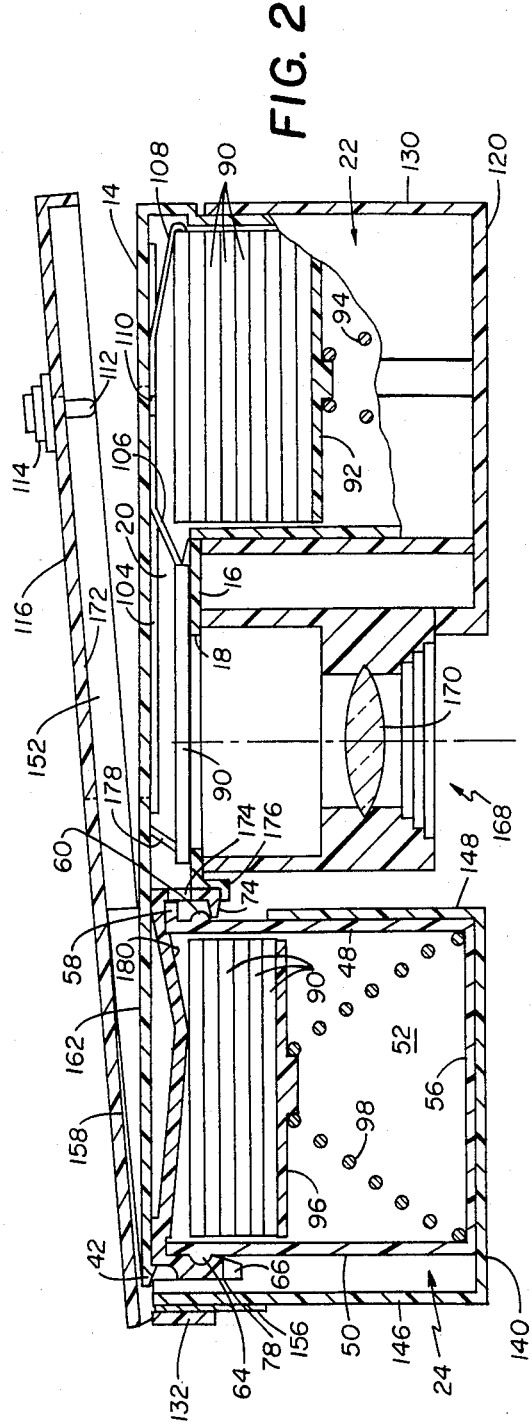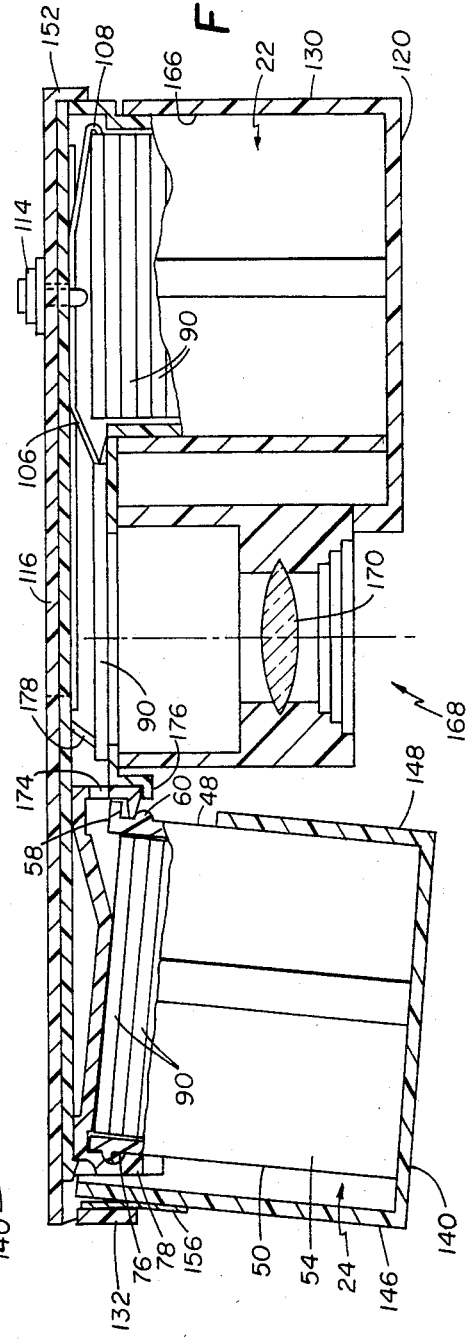

PHOTOGRAPHIC FILM ASSEMBLAGE HAVING PREMOUNTED FILM FRAMES

BACKGROUND OF THE INVENTION

1. Field of the Invention

This invention relates to a photographic film assemblage of the type which includes instant type film.

2. Description of the Prior Art

The present invention relates to a film assemblage of the type which includes instant or self-developing type film, preferably transparency film, and more particularly to such an assemblage which may remain attached to a photographic apparatus while a portion thereof containing one or more photographically exposed premounted film frames may be removed therefrom for subsequent placement in a processor.

U.S. Pat. No. 4,114,166 describes a photographic apparatus in the form of a camera which is adapted to receive a film assemblage of the type which includes a plurality of film units of the instant transparency type. The film assemblage includes a supply cassette containing a stack of film units and a separate storage cassette. The supply and storage cassettes are individually loaded into the camera on opposite sides of an exposure station and a film advance assembly is manually actuated so as to move a film unit from the supply cassette to the exposure station. After its exposure, the film advance assembly is actuated again thereby moving the exposed film unit from the exposure station to a position between a pair of rollers while simultaneously moving another film unit from the supply cassette to the exposure station. The rollers rupture a container of processing liquid attached to the film unit's leading end and spread its contents between layers of the film unit to initiate the formation of a visible image while simultaneously advancing the film unit into the storage cassette.

While the above described system of U.S. Pat. No. 4,114,166 has many admirable attributes there is still room for improvement. For example, loading of the film assemblage could be improved by combining the supply and storage cassettes into a structure, which may be loaded as a unit as is taught by U.S. Pat. No. 3,728,949. Further, and more importantly, the versatility of the system could be enhanced if the processing of the exposed film units were carried out in an environment which is more conducive to the proper development of the latent image. For example, the ambient temperature at the location where the film is being exposed may be at a level which is above or below that required for optimum development of the latent image by the processing liquid.

SUMMARY OF THE INVENTION

The present invention relates to a photographic film assemblage of the type which includes a plurality of premounted film frames of the self-developing type. The film assemblage includes a support having an exposure opening therein, a supply chamber connected to one end of the support and a storage chamber connected to an opposite end of the support. Stacked within the supply chamber is a plurality of individual, premounted, film frames of the instant type, preferably 35 mm transparency film similar to that described in U.S. Pat. No. 3,682,637.

The film assemblage is constructed to be positioned within or attached to photographic apparatus such as an adapter for use in photographing the sequential red, green and blue displays of a computer generated image on a cathode ray tube (CRT) of a computer image recorder of the type sold by Polaroid Corporation under the name "Palette". The film assemblage is inserted into the adapter and is operatively coupled thereto in response to the closing of the adapter's loading door. This closing of the loading door results in a main housing of the storage chamber being pivoted through a small angle relative to a cover of the storage chamber thus moving a wall of the main housing out of interference with a slot in the cover. Thus positioned, an exposed film frame may be moved from the support, through the slot, and into the storage chamber.

After the film assemblage has been operatively coupled to the adapter, a film advancing apparatus, comprised of first and second oppositely extending cantilevered fingers, mounted between the support and the supply chamber, is manually actuated so as to move a premounted film frame from the top of the stack within the supply chamber, through a passageway in the support, to a position in alignment with an exposure aperture in the support and the objective lens of the adapter. After its exposure, the film advance apparatus is actuated in a reciprocating manner which enables the first cantilevered finger to move the exposed film frame into the storage chamber while the second cantilevered finger simultaneously moves another of the premounted film frames from the supply chamber to its exposure positon within the support. After one or more of the premounted film frames has been exposed and moved into the storage chamber, the latter may be released from the support and taken to a film processor for subsequent processing of the film frames contained therein. This is accomplished by opening the adapter's loading door thereby enabling a spring to move the main housing of the storage chamber back into lightight relation with its cover. The film assemblage is then removed as a unit, the storage chamber detached from the end of the support and the remainder of the film assembly returned to the adapter. If the photographer wishes to continue photographing images while the previously exposed film frames are being processed he merely attaches an empty spare storage chamber to the end of the support before operatively coupling the film assemblage to the adapter.

An object of the invention is to provide a photographic film assemblage of the type which includes a plurality of individual, premounted, film frames of the instant type with a storage chamber which not only receives such film frames subsequent to their exposure but which is also adapted to be uncoupled therefrom for transport to a film processor.

Another object of the invention is to provide a film assemblage of the type described above with its own film advancing assembly.

Still another object of the invention is to provide a film assemblage which is adapted to function as a camera back.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the invention reference should be had to the following detailed description taken in connection with the accompanying drawings wherein:

FIG. 2 is a side view in cross section of the film assemblage of FIG. 1 located in an adapter, with a loading door of the adapter being shown in a partly closed position;

FIG. 3 is a view similar to FIG. 2 showing the adapter's loading door in a closed position;

DETAILED DESCRIPTION OF THE INVENTION

Figure 1:
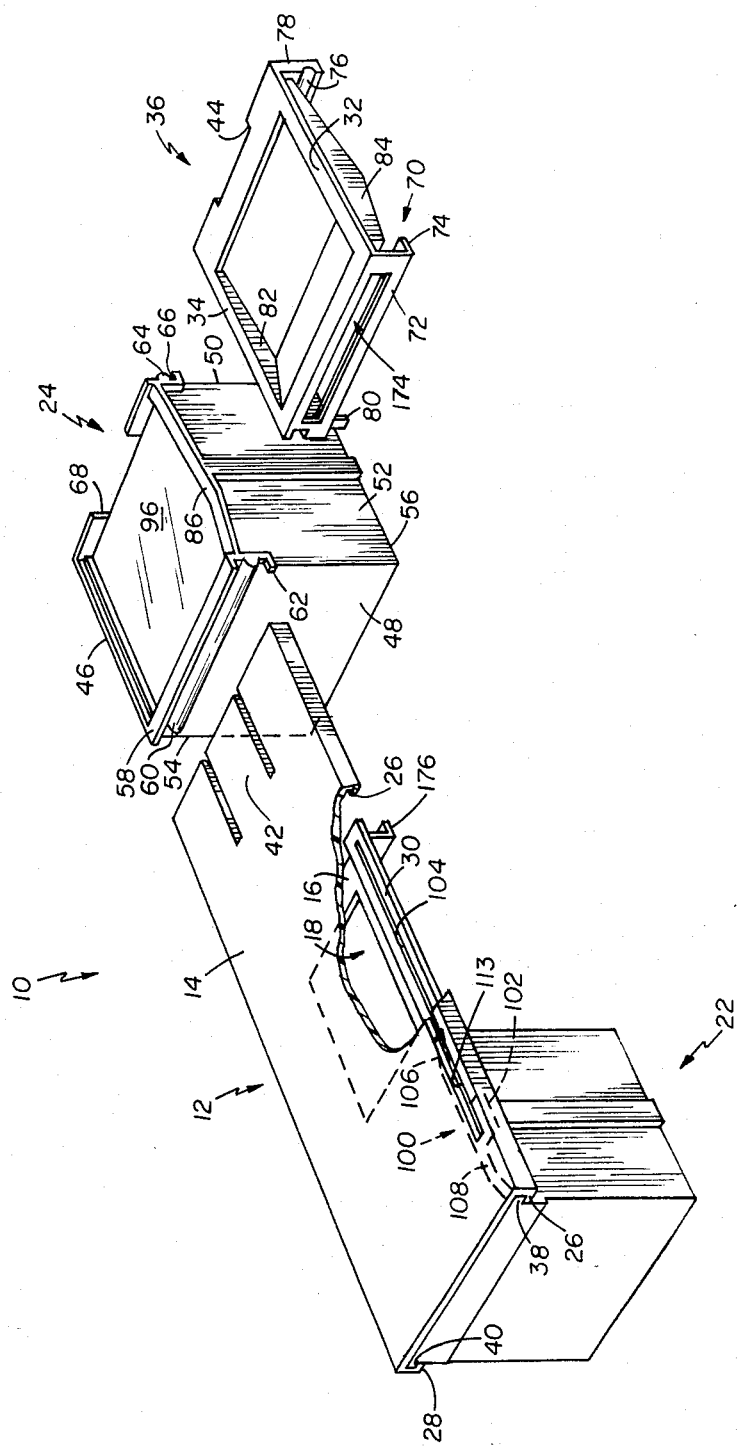
FIG. 1 is a partly exploded perspective view, partly sectioned, of a photographic film assemblage.

Reference is now made to the drawings, and in particular to FIGS. 1-3, wherein is shown a photographic film assemblage 10 which represents a preferred embodiment of the instant invention. The film assemblage 10 includes a planar support 12 having an upper wall 14 which extends the entire length of the assemblage 10 and a shorter lower wall 16 having an exposure aperture 18 therein. The walls 14 and 16 cooperate with each other to define a passageway 20 which leads from a supply chamber 22 mounted on one end of the support 12 to a storage chamber 24 mounted on the opposite end of the support 12.

The top wall 14 is formed at its sides with inwardly facing channels 26 and 28 which extend the entire length of the top wall 14. The channels 26 and 28 are adapted to slidably receive outwardly extending flanges 30 (only one being shown) on the lower wall 16, flanges 32 and 34 on opposite sides of a cover 36 of the storage chamber 24, and similar flanges 38 and 40 on the supply chamber 22. The end of the top wall 14 which supports the storage chamber 24 is integrally formed with a resilient finger 42 which is adapted to snap over an end of the cover 36 and be received by a recess 44 in the cover 36 to releasably secure the cover 36 to the top wall 14 in the position shown in FIGS. 2 and 3.

The storage chamber 24 includes a generally cube-shaped main housing 46 having front and rear walls 48 and 50, respectively, which are interconnected by a pair of side walls 52 and 54 and a bottom wall 56. The front wall 48 includes a horizontally extending flange 58, a horizontally extending protuberance 60, and an outwardly extending stop 62. The rear wall 50 includes a horizontally extending protuberance 64 similar to the one shown at 60, a stop 66 similar to the stop 62, and a recess 68. The flange 58 and the protuberance 60 are adapted to be received within a horizontally extending channel 70 formed in part by a front wall 72 of the cover 36 and an inwardly turned flange 74, while the protuberance 64 is adapted to be slidably and pivotally received by a horizontally extending groove 76 formed in a rear wall 78 of the cover 36. The cover 36 is adapted to be slidably connected to the main housing 46 in lighttight relation by first locating a stop 80 on the wall 72 of the cover 36 behind the stop 62 on the main housing 46 and another stop (not shown) on the rear wall 78 behind the stop 66, and then rotating the cover 36 into the same plane as that generally occupied by the top of the main housing 46 so as to locate the protuberance 60 in alignment with the channel 70 and the protuberance 64 in alignment with the open end of the groove 76. The cover 36 is then moved relative to the main housing 46 until a vertical flange 82 on the cover 36 engages the interior surface of the side wall 54 and a similar flange 84 on the cover 36 engages an outwardly extending flange 86 on the side wall 52 of the main housing 46.

The supply chamber 22 is adapted to receive a plurality of premounted film frames 90 of the type shown and described in the copending application Ser. No. 675,759, filed on Nov. 28, 1984 by Frank M. Czumak et al. entitled CAMERA BACK, now Pat. No. 4,568,163, and assigned in common herewith. The premounted film frames 90 are supported in a stack by a platen 92 and are resiliently urged by a spring 94 toward a stop (not shown) near the top open end of the supply chamber 22 such that the uppermost premounted film frame 90 is located in position to be advanced from the supply chamber 22 to its exposure position via the passageway 20 in the support 12. The storage chamber 24 is provided with a similar platen and spring 96 and 98, respectively.

The photographic film assemblage 10 also includes a means for sequentially advancing the premounted film frames 90 from the supply chamber 22 to the support 12 and, subsequent to their photographic exposure, from the support 12 to the storage chamber 24. Specifically, the advancing means includes a generally T-shaped member 100 having a leg 102 (FIG. 1) whose free end is bent downwardly at a right angle relative to the remainder of the leg so as to enable it to be received within a longitudinally extending guide slot 104 in the flange 30 shown in FIG. 1. The T-shaped member 100 also includes first and second resilient fingers 106 and 108, respectively, which extend outwardly from each other in cantilever fashion. The T-shaped member 100 also includes an aperture 110 which is adapted to receive a pin 112 of a manually reciprocal button 114 located in a slot 115 in a loading door 116 of an adapter 118, as will be more fully described hereinafter.

The photographic film assemblage 10 is adapted to be loaded as a unit into, or attached to, photographic apparatus, such as the adapter 118 which is to be attached to the aforementioned computer image recorder. The adapter 118 includes a housing defined by a bottom wall 120, a pair of similarly shaped side walls 122 and 124 which terminate at one end in a pair of tapered arms 126 and 128, respectively, a first end wall 130 and a second shorter end wall 132 (see FIGS. 2 and 3) which interconnects the ends of the arms 126 and 128. Extending outwardly from the side wall 122 is a flange 134 which rotatably supports a screw or bolt 136 used to connect the adapter 118 to the computer image recorder.

Figure 4:
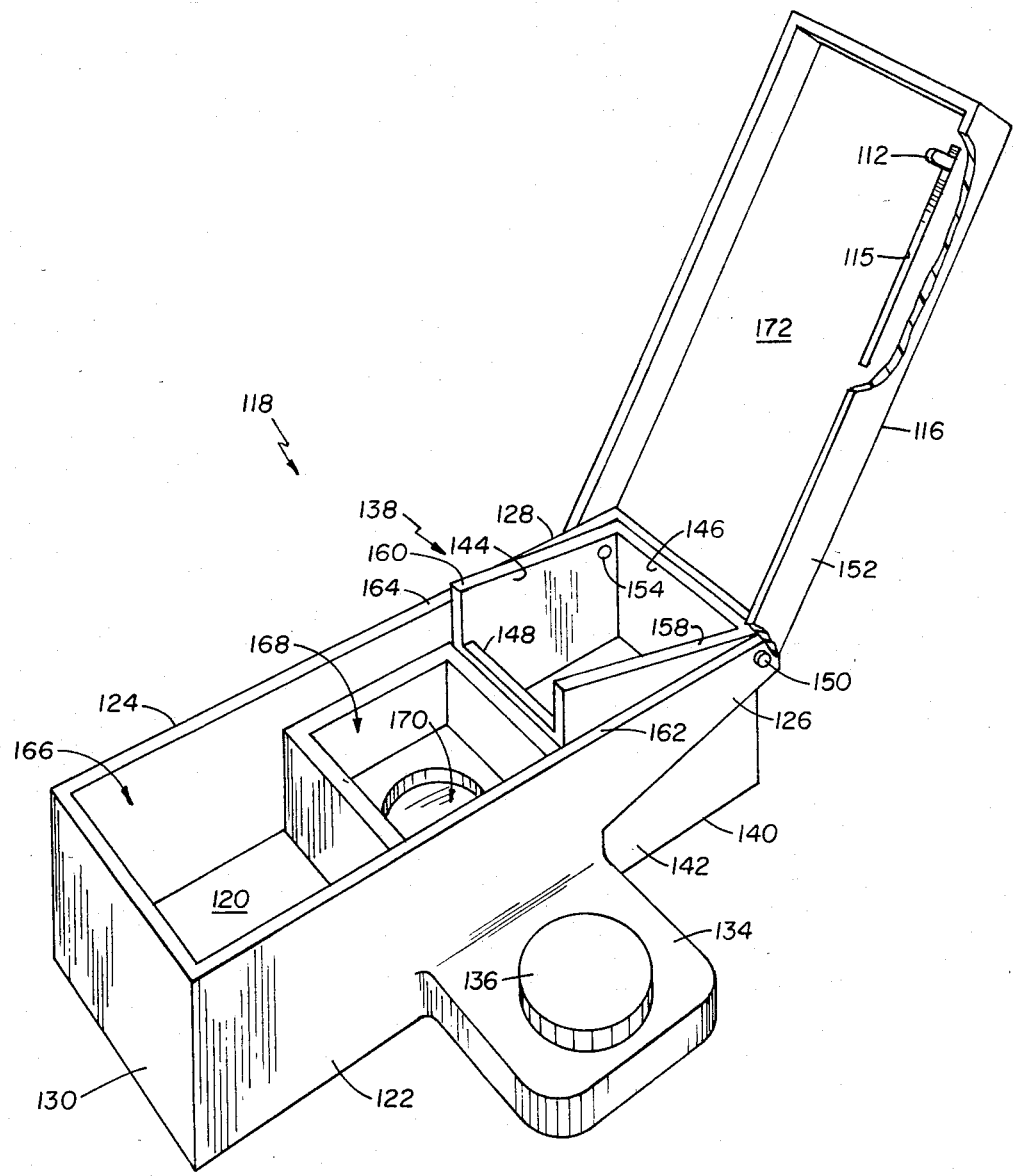
FIG. 4 is a perspective view of the adapter shown in FIGS. 2 and 3.

A cube-shaped housing 138 having an open top is mounted between the tapered arms 126 and 128. The housing 138 includes a bottom wall 140, a pair of side walls 142 and 144, a first end wall 146, and a second end wall 148 of lesser height than the first end wall 146. The housing 138 is pivotally coupled to the tapered arms 126 and 128 by a pin 150, which extends through a flange 152 in the loading door 116, through the tapered arm 126, and the side wall 142; and by a similar pin 154 which extends through the flange 152 on the opposite side of the loading door 116 and then through the tapered arm 128 and the side wall 144. The housing 138 is resiliently biased into the position shown in FIGS. 2 and 4 by a flat leaf spring 156 which is mounted between the second end wall 132 of the adapter 118 and the first end wall 146 of the housing 138. Also, in this position, the upper edges 158 and 160 of the side walls 142 and 144, respectively, define a small angle with respect to the top edges 162 and 164 of the tapered arms 126 and 128, respectively.

During the loading of the film assemblage 10 into the adapter 118, the housing 138 receives the storage chamber 24, a chamber 166 on the opposite end of the adapter 118 simultaneously receives the supply chamber 22, and the support 12 bridges an exposure chamber 168 having an objective lens 170 therein. The film assemblage 10 is then operatively coupled to the adapter 118 by pivoting the loading door 116 into a fully closed position, as shown in FIG. 3. During the closing of the loading door 116, its interior surface 172 engages the edges 158 and 160 of the housing 138, as shown in FIG. 2, and forces the housing 138 to rotate about the axes of the pins 150 and 154 into the position shown in FIG. 3. As the housing 138 pivots in a clockwise direction, as viewed in FIGS. 2 and 3, its second end wall 148 applies a force to the wall 48 of the main housing 46 thus causing the latter to rotate in a similar direction about the axis of the protuberance 64. Such latter rotation of the main housing 46 moves the top portion of the wall 48 out of interference with a slot 174 in the front wall 72 of the cover 36 of the storage chamber 24 while a laterally extending flange 176 located in supporting relation with the flange 74 of the cover 36, in conjunction with the support provided by the interface between the channels 26 and 28 and the flanges 32 and 34, holds the cover 36 in place. In other words, the main housing 46 of the storage chamber 24 is moved in response to the closing of the loading door 116 from a second position, wherein the storage chamber 24 is lighttight, to a first position, wherein a premounted film frame 90 may be moved from its exposure position within the support 12 to the interior of the storage chamber 24 via the slot 174. During the closing of the door 116, 1) the spring 156 is tensioned so as to provide a means for returning the adapter housing 138 and thus the main housing of the storage chamber 24 into lighttight relation with its cover 36, and 2) the pin 112 enters the aperture 110 in the T-shaped member 100. Suitable means (not shown) are provided for releasably securing the loading door 116 in its closed position.

As described hereinbefore, a premounted film frame 90 is advanced from its position on top of the stack located in the supply chamber 22 by moving the button 114 from the right to the left, as viewed in FIG. 3, the wall 14 being provided with a longitudinally extending slot 113 for such movement of the button 114. Suitable means (not shown) are provided for light sealing the slot 113. Such movement results in the first resilient finger 106 moving any exposed premounted film frame 90 which may be located at its exposure position, in alignment with the axis of the objective 170, into the storage chamber 24. Simultaneously therewith, the second resilient finger 108 grabs an end of the uppermost premounted film frame 90 in the stack and moves it into its exposure position wherein it is frictionally retained by a resilient member 178 which extends downwardly from the interior surface of the wall 14 of the support 12 into engagement with a lateral side of the film frame's mount. As an exposed premounted film frame 90 enters the storage chamber 24 via the slot 174, its leading edge engages an inclined surface 180 of the cover 36 thereby causing the film frame 90 to be deflected downwardly into engagement with the platen 96 or into engagement with the uppermost exposed unit being supported by the platen 96. The exposure of the premounted film frame 90 may be accomplished by momentarily displaying a scene on the aforementioned CRT. Alternatively, the adapter 118 may be provided with a shutter while the scene remains displayed on the screen.

After one or more of the premounted film frames 90 have been photographically exposed and moved into the storage chamber 24, it may become desirable to process one or more of the exposed film frames. In such a case, the user merely moves the loading door 116 of the adapter 118 into its open position thereby allowing the tensioned spring 156 to pivot the housing 138 of the adapter 118 and thus the main housing 46 of the film assemblage 10 back into their original positions, as shown in FIG. 2, where the wall 48 of the storage chamber is in lighttight relation to the slot 174. The film assemblage 10 may then be removed from the adapter 118, the resilient finger 42 on the support 12 raised to thereby allow the storage chamber 24 to be slid in a direction away from the support 12 until it is detached therefrom, and the storage chamber 24 then transported to and inserted into a film processor (not shown) in an inverted manner for processing of one or more of the exposed premounted film frames 90 contained therein. During or after the insertion of the storage chamber 24 into the processor, suitable means slide the cover 36 relative to the main housing 46 until the stop 80 engages the stop 62, and another stop (not shown) on the cover 36 engages the stop 66. This movement of the cover 36 enables the stack of exposed premounted slides 90 to drop a fraction of an inch onto a support of the film processor while the cover 36 maintains the open end of the storage chamber in spaced relation to the processor's support, i.e., the flange 58 of the wall 48 is spaced from the support by a distance substantially equal to the thickness of the flange 32 of the cover 36, which in turn is slightly greater than the thickness of one of the premounted film frames 90. A film frame advancing member of the processor may then enter the storage chamber 24 via the recess 68 therein and move the lowermost exposed premounted film frame 90 out of the storage chamber 24 via the space between the processor's support and the flange 58.

Although not shown in the drawings, suitable light blocking means, such as flocking, may be provided in the passageway 20 to prevent inadvertent exposure of any of the premounted film frames 90 located in the supply chamber 22. Also, when the photographer anticipates that the next film frame 90 to be exposed is also to be immediately processed, means (not shown) may be actuated to move the end of the arm 108 of the film advancing means to a position wherein it will not advance another of the film frames 90 into position for exposure as the film frame 90 which is to be immediately processed is being moved into the storage chamber 24.

During the time that the storage chamber 24 is detached from the remainder of the film assemblage 10, the photographer may wish to expose one or more of the premounted film frames remaining in the supply chamber 22. In such a case, one may attach an extra or spare film chamber to the film assemblage 10 and reinsert the assemblage into the adaptor 118.

Figure 5:
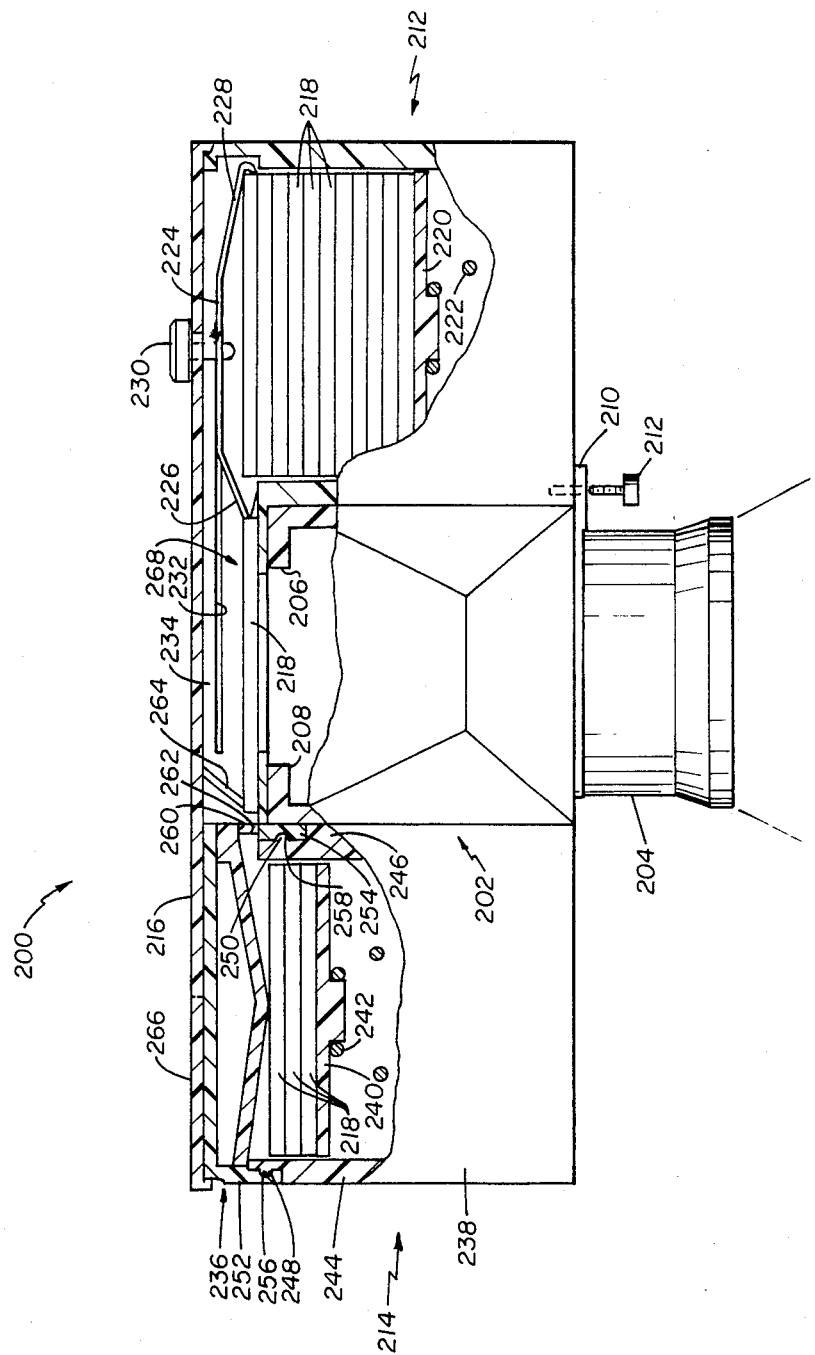
FIG. 5 is a plan view schematically depicting a film assemblage similar to that shown in FIG. 1 being used as a camera back.

Reference is now made to FIG. 5 wherein a photographic film assemblage 200, similar to the film assemblage 10, is shown as a camera back attached to the main body 202 of a 35 mm SLR camera. A lens and shutter assembly 204 extends forwardly of the main body 202 in optical alignment with an exposure opening 206 in a rear wall 208 of the main body 202. Extending from the shutter and lens assembly 204 is a flange 210 having an opening therein for receiving a thumb screw 212 for attaching the camera back 200 to the camera's main body 202.

The camera back or film assemblage 200 includes cube-shaped supply and storage chambers 212 and 214, respectively, which are mounted on opposite ends of a support plate 216, much in the same manner that the supply and storage chambers 22 and 24, respectively, are mounted on the wall 14, as previously described. A stack of premounted film frames 218 (similar to the premounted film frames 90) is supported within the supply chamber 212 by a platen 220 which is resiliently biased by a coil spring 222 so as to locate the uppermost film frame 218 in position to be moved into its exposure position in optical alignment with the lens and shutter assembly 204. As in the previously described embodiment shown in FIGS. 1-3, the camera back or film assemblage 200 is provided with a film frame advance assembly 224 having oppositely extending resilient fingers 226 and 228. The film frame advance assembly 224 is coupled to a manually actuable button 230 which in turn is located within a suitably lighttight longitudinally extending slot (not shown) in the support plate 216. The assembly 224 also includes a portion which rides in a longitudinally extending slot 232 located within a bottom wall 234 of the film assemblage 200 so as to guide the assembly 224 for reciprocating movement toward and away from the storage chamber 214.

The storage chamber 214 includes a cover 236 and a main housing 238 having a platen 240 therein which is resiliently supported by a coil spring 242. The main housing 238 includes spaced walls 244 and 246 each of which is formed near its upper end with a laterally extending protuberance 248 and 250, respectively. The cover 236 includes spaced walls 252 and 254 each of which is formed with a laterally extending groove 256 and 258, respectively, which are adapted to slidably receive the protuberances 248 and 250 for slidably attaching the cover 236 to the open end of the main housing 238. The cover's wall 254 has a laterally extending slot 260 therein through which a premounted film frame 218 is adapted to be moved into the storage chamber 214. The slot 260 is rendered lighttight by an opaque flexible shield 262 which is adapted to be momentarily deflected by a leading edge of a premounted film frame 218 during its movement into the storage chamber 214.

As shown in FIG. 5, several of the premounted film frames 218 have already been photographically exposed and moved into the storage chamber 214. After the premounted film frame 218, shown in FIG. 5 in alignment with the lens and shutter assembly 204, has been exposed, the button 230 is manually moved to the left thereby causing the finger 226 to advance the exposed premounted film frame 218 into the storage chamber 214 while the finger 228 advances another of the premounted film frames 218 into position for exposure where it is frictionally held by a resilient member 264. If at this time the user wishes to process one or more of the exposed film frames 218 located within the storage chamber 214, he merely lifts a resilient tab 26 (similar to that shown at 42 in FIG. 1) on the support plate 216 and slides the storage chamber 214 to the left so as to remove a pair of laterally spaced rails (not shown) on sides of the cover 236 from a pair of laterally spaced channels (not shown) depending from the support plate 216. Suitable light sealing means (not shown) are provided at the open end of the passageway 268 for preventing inadvertent exposure of the film frames 218 remaining in the camera back 200. The storage chamber 214 is then inserted into a film processor in the same manner as previously described and one or more of the exposed premounted film frames 218 removed therefrom and processed so as to initiate the formation of a visible image. Again, as in the previous embodiment, if the user wishes to continue to expose one or more of the remaining film frames 218 without waiting for the processing of the exposed film frames to be completed, he may merely attach a spare storage chamber to the support plate 216.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic film assemblage for use with a photographic apparatus, said assemblage comprising:
    means for supporting a film frame in position for exposure, said supporting means including first and second opposite ends;
    means for defining a supply chamber at said first end of said supporting means;
    means for defining a storage chamber at said second end of said supporting means;
    a plurality of premounted film frames of the self-developing type mounted in a stack within said supply chamber;
    means for urging said stack in a direction which locates one of said premounted film frames in position to be advanced from said supply chamber to said supporting means;
    means for sequentially advancing said premounted film frames from said supply chamber to said supporting means and, subsequent to their photographic exposure, from said supporting means to said storage chamber; and
    said supporting means and said storage chamber further include means for detachably coupling said storage chamber to said supporting means, whereby said storage chamber may be detached from said supporting means and placed within a film processor for the processing of any exposed premounted film frames located within said storage chamber.

2. A photographic film assemblage as defined in claim 1 wherein said storage chamber includes means movable between a first position, wherein said premounted film frames may be sequentially moved from said supporting means into said storage chamber, and a second position, wherein said storage chamber is rendered lighttight.

3. A photographic film assemblage as defined in claim 2 wherein said movable means is adapted to be moved from said second position to said first position upon said photographic film assemblage being operatively coupled with the photographic apparatus.

4. A photographic film assemblage as defined in claim 2 wherein said movable means is adapted to move from said first position to said second position upon the opening of a loading door of the photographic apparatus.

5. A photographic film assemblage as defined in claim 2 wherein said movable means includes a main housing and said storage chamber further includes a cover having an opening therein through which said premounted film frames are adapted to be moved into said main housing when said main housing is in said first position.

6. A photographic film assemblage as defined in claim 5 wherein said cover includes means for slidably coupling said cover to said main housing for movement to a position in which exposed premounted film frames may be removed from said main housing for processing.

7. A photographic film assemblage as defined in claim 1 wherein said advancing means is constructed to advance a premounted film frame from said supporting means to said storage chamber while simultaneously advancing another of said premounted film frames from said supply chamber to said supporting means.

8. A camera back for use with a photographic apparatus, said camera back comprising:
   means for supporting a film frame in position for exposure, said supporting means including first and second opposite ends;
   means for defining a supply chamber at said first end of said supporting means;
   means for defining a storage chamber at said second end of said supporting means;
   a plurality of premounted film frames of the self-developing type mounted in a stack within said supply chamber;
   means for urging said stack in a direction which locates one of said premounted film frames in position to be advanced from said supply chamber to said supporting means;
   means for sequentially advancing said premounted film frames from said supply chamber to said supporting means and, subsequent to their photographic exposure, from said supporting means to said storage chamber;
   means for cooperating with a connecting member on the photographic apparatus for detachably connecting said camera back to the photographic apparatus; and
   said supporting means and said storage chamber further include means for detachably coupling said storage chamber to said supporting means, whereby said storge chamber may be detached from said supporting means and placed within a film processor for the processing of any exposed premounted film frames located within said storage chamber.

9. A camera back as defined in claim 8 wherein said storage chamber includes a main housing and a cover, said cover further includes means for slidably coupling said cover to said main housing for movement to a position in which exposed premounted film frames may be removed from said housing for processing.

10. A camera back as defined in claim 1 wherein said advancing means is constructed to advance a premounted film frame from said supporting means to said storage chamber while simultaneously advancing another of said premounted film frames from said supply chamber to said supporting means.

* * * * *